US012763338B2

(12) United States Patent
Lee et al.

(10) Patent No.: US 12,763,338 B2
(45) Date of Patent: Oct. 13, 2026

(54) AQUEOUS PRIMARY BATTERY FOR CARBON DIOXIDE CONVERSION CONTAINING METAL NANOCLUSTER CATALYST AND CARBON DIOXIDE CONVERSION METHOD USING SAME

(71) Applicant: Industry-Academic Cooperation Foundation, Yonsei University, Seoul (KR)

(72) Inventors: Dongil Lee, Goyang-si (KR); Yongsung Jo, Seoul (KR)

(73) Assignee: Industry-Academic Cooperation Foundation, Yonsei University, Seoul (KR)

( * ) Notice: Subject to any disclaimer, the term of this patent is extended or adjusted under 35 U.S.C. 154(b) by 787 days.

(21) Appl. No.: 18/189,418

(22) Filed: Mar. 24, 2023

(65) Prior Publication Data

US 2023/0307662 A1 Sep. 28, 2023

(30) Foreign Application Priority Data

Mar. 25, 2022 (KR) ........................ 10-2022-0037035

(51) Int. Cl.
*H01M 12/06* (2006.01)
*H01M 4/42* (2006.01)
*H01M 4/86* (2006.01)
*H01M 4/90* (2006.01)

(52) U.S. Cl.
CPC ....... *H01M 4/9008* (2013.01); *H01M 4/8605* (2013.01); *H01M 12/06* (2013.01); *H01M 2004/8689* (2013.01)

(58) Field of Classification Search
CPC .. H01M 4/9008; H01M 4/8605; H01M 12/06; H01M 2004/8689; H01M 6/045
See application file for complete search history.

(56) References Cited

FOREIGN PATENT DOCUMENTS

| | | | | |
|---|---|---|---|---|
| JP | 2016024944 A | 2/2016 | | |
| KR | 20170114870 A | * 10/2017 | .............. | B01J 23/56 |
| KR | 10-2020-0090504 A | 7/2020 | | |
| KR | 20200125169 A | 11/2020 | | |
| KR | 20200125497 A | 11/2020 | | |
| KR | 20220013075 A | 2/2022 | | |

OTHER PUBLICATIONS

KR20200125169A. Nov. 4, 2020. English machine translation by EPO. (Year: 2020).*
KR20170114870A. Oct. 16, 2017. English machine translation by EPO. (Year: 2017).*
KR20200090504A. Jul. 29, 2020. English machine translation by EPO. (Year: 2020).*

(Continued)

*Primary Examiner* — James Lee
(74) *Attorney, Agent, or Firm* — DICKINSON WRIGHT PLLC

(57) ABSTRACT

The present invention provides an aqueous primary battery for carbon dioxide conversion containing a metal nanocluster catalyst, and a carbon dioxide conversion method capable of spontaneously converting carbon dioxide using the same even at high current density without the need for external power.

18 Claims, 12 Drawing Sheets

(56) References Cited

OTHER PUBLICATIONS

Kim, C., et al. "Highly Efficient $CO_2$ Utilization via Novel Aqueous Zn or Al-$CO_2$ Systems for $H_2$ and Electricity Production" Angew. Chem. Int. Ed. 10.1002/anie.201904763; http://dx.doi.org/10.1002/anie.201904763.
Wang, X., et al. "Rechargeable Zn-CO2 Electrochemical Cells Mimicking Two-Step Photosynthesis" Adv. Mater. 2019, 1807807; pp. 1-8.; DOI: 10.1002/adma.201807807.
Wang, Y., et al. "Efficient solar-driven electrocatalytic CO2 reduction in a redox-medium-assisted system" Nature Communications, (2018) 9:5003, pp. 1-8; DOI: 10.1038/s41467-018-07380-x.
KR 10-2022-0037035 First Office Action mailed Oct. 15, 2024 [English machine translation].
KR 10-2022-0037035 Notice of Allowance mailed Oct. 30, 2025.
KR 10-2022-0037035 Notice of Allowance mailed Oct. 30, 2025 [English machine translation].

* cited by examiner

AQUEOUS PRIMARY BATTERY FOR CARBON DIOXIDE CONVERSION CONTAINING METAL NANOCLUSTER CATALYST AND CARBON DIOXIDE CONVERSION METHOD USING SAME

CROSS-REFERENCE TO RELATED APPLICATIONS

This application claims priority under 35 U.S.C. § 119 to Korean Patent Application No. 10-2022-0037035, filed on Mar. 25, 2022, the disclosure of which is incorporated herein by reference in its entirety.

TECHNICAL FIELD

The following disclosure relates to an aqueous primary battery for carbon dioxide conversion containing a metal nanocluster catalyst and a conversion method for reducing carbon dioxide to carbon monoxide using the same.

BACKGROUND

Recently, the emission of greenhouse gases is continuously increasing with industrialization, and carbon dioxide accounts for the largest proportion among greenhouse gases. According to the type of industry, the emission of carbon dioxide is the highest in energy supply sources such as power plants, and carbon dioxide emitted from the cement/steel/refining industries, including power generation, accounts for half of the world's carbon dioxide generation.

The fields of carbon dioxide conversion may be roughly divided into chemical conversion, biological conversion, and direct utilization, and the technical categories may be divided into catalysts, electrochemical processes, bioprocesses, light utilization, mineralization (carbonation), polymers, etc. Among them, an electrochemical conversion of carbon dioxide is one of the storage methods of renewable energy being studied in response to the depletion of fossil fuels, and is attracting attention as a solution to global warming in the framework of reducing greenhouse gas. Among them, the conversion of carbon monoxide, which is known to be advantageous in terms of marketability and economy, to carbon monoxide is considered important.

As an electrochemical carbon dioxide conversion catalyst, metals such as gold and silver are known to have good selectivity for carbon monoxide. However, in a case of a polycrystalline metal catalyst, there is a problem that a high overvoltage is required for carbon dioxide conversion and a catalytic activity is not excellent. In this regard, catalysts on small scale have been extensively developed to increase a surface area and modify an electronic structure. However, there are still limitations in terms of selectivity, and the catalytic activity often does not reach the level of commercialization.

Metal nanoclusters such as gold and silver are attracting attention as materials with unique optical and electrochemical properties. These nanoclusters may have stability at certain ratios of metal and ligand, and accordingly, they may be synthesized in various sizes through various synthesis methods. Nanoclusters of a certain size or less have discontinuous energy levels and behave like molecules even though they are composed of metals. These metal nanoclusters show high selectivity to carbon monoxide in carbon dioxide conversion, and their catalytic activity is also excellent.

On the other hand, the existing method of electrically converting carbon dioxide had a problem of energy consumption because carbon dioxide was converted only when a high voltage was applied. In addition, the conventional carbon dioxide conversion battery using zinc or aluminum as an anode had a problem in that energy consumption for reducing oxidized metal generated in the anode was very high. Therefore, research is required on a more efficient and economical method of converting carbon dioxide, a greenhouse gas, into high value-added carbon monoxide.

RELATED ART DOCUMENT

Patent Document (Patent Document 1) Korean Patent Laid-open Publication No. 10-2020-0090504 A

Non-Patent Document (Non-Patent Document 1) Angew. Chem. Int. Ed. 2019, 58, 9506-9511.

SUMMARY

An embodiment of the present invention is to provide an aqueous primary battery for carbon dioxide conversion that contains a metal nanocluster catalyst and does not require external power.

Another embodiment of the present invention is to provide an aqueous primary battery for carbon dioxide conversion capable of minimizing resistance of an aqueous primary battery and preventing ion crossover during carbon dioxide conversion.

Another embodiment of the present invention is to provide a conversion method for reducing carbon dioxide to carbon monoxide, which can be spontaneously converted even at a high current density, by using the aqueous primary battery for carbon dioxide conversion.

In one general aspect, there is provided an aqueous primary battery for carbon dioxide conversion containing a metal nanocluster catalyst.

The aqueous primary battery for carbon dioxide conversion includes: a first electrolyte solution that is an aqueous electrolyte accommodated in a first reaction space; a cathode in contact with the first electrolyte solution; a second electrolyte solution that is an aqueous electrolyte accommodated in the second reaction space; and an anode made of a metal material in contact with the second electrolyte solution, wherein the cathode includes a metal nanocluster catalyst.

In the aqueous primary battery for carbon dioxide conversion according to an embodiment, the cathode may be at least partially submerged in the first electrolyte solution, and the anode may be at least partially submerged in the second electrolyte solution.

In the aqueous primary battery for carbon dioxide conversion according to an embodiment, the first reaction space and the second reaction space may each independently include an electrolyte supply spacer, the anode and cathode may contact one surface of each electrolyte supply spacer, and the electrolyte supply spacer may continuously supply each electrolyte to the anode or cathode.

The anode made of a metal may be aluminum (Al) or zinc (Zn).

The metal nanocluster may be represented by the following Formula 1:

$$M_xN_y(SR)_z \quad \text{[Formula 1]}$$

wherein M is Au;

N is Ag, Cu, Ni, Pd or Pt;

SR is $C_1$-$C_{20}$ alkylthiol, $C_6$-$C_{20}$ allylthiol, $C_3$-$C_{20}$ cycloalkanethiol, $C_5$-$C_{20}$ heteroallylthiol, $C_3$-$C_{20}$ heterocycloalkanethiol, or $C_6$-$C_{20}$ arylalkanethiol;

x is 2, 4 12 or 25;

y is 0, 1, 2, 3, 4 or 32; and z is 8, 10, 18 or 30.

The metal nanocluster may be represented by the following Formula 2:

$$M_x(SR)_y \quad \text{[Formula 2]}$$

wherein M is Au or Ag;

SR is $C_1$-$C_{20}$ alkylthiol, $C_3$-$C_{20}$ alkenylthiol, $C_3$-$C_{20}$ alkynylthiol, $C_6$-$C_{20}$ allylthiol, $C_3$-$C_{20}$ cycloalkylthiol, $C_5$-$C_{20}$ heteroallylthiol, $C_3$-$C_{20}$ heterocycloalkylthiol, or $C_6$-$C_{20}$ aryl$C_1$-$C_{20}$ alkylthiol;

x is 25, 38 or 144; and y is 18, 24, 25 or 60.

The first electrolyte solution may be an acidic, neutral, or basic electrolyte, and the second electrolyte solution may be a strongly basic electrolyte.

In an embodiment of the present invention, the cathode may include a porous support and a metal nanocluster fixed to pores of the porous support.

In addition, in the aqueous primary battery for carbon dioxide conversion according to an embodiment of the present invention, the metal of the anode may be oxidized to a metal oxide, and the cathode may reduce carbon dioxide to carbon monoxide.

The aqueous primary battery for carbon dioxide conversion according to the present invention may be operated without external power.

The aqueous primary battery for carbon dioxide conversion according to an embodiment may further include a porous ion-permeable member partitioning the first reaction space and the second reaction space.

In an embodiment, the material of the ion-permeable member may be glass, and in another embodiment, the porous ion-permeable member may be an ion exchange membrane.

In an embodiment of the present invention, the aqueous primary battery for carbon dioxide conversion may further include: a cathode support positioned on one surface of the cathode, and an anode support positioned on one surface of the anode, wherein the cathode support may include a first electrolyte inlet and a first electrolyte outlet, the anode support may include a second electrolyte inlet and a second electrolyte outlet, and the inlet and outlet may be connected to each electrolyte supply spacer.

The cathode support may further include: a carbon dioxide inlet, a carbon monoxide outlet, and a flow path connecting the carbon dioxide inlet and the carbon monoxide outlet on one surface.

In another general aspect, there is provided a carbon dioxide conversion method, the conversion method including:

supplying carbon dioxide to a cathode of an aqueous primary battery for carbon dioxide conversion as described above; and obtaining carbon monoxide converted from carbon dioxide at the cathode.

In addition, in the carbon dioxide conversion method according to an embodiment of the present invention, a metal oxide generated from the second electrolyte solution may be separated, and the separated second electrolyte solution may be recycled to the aqueous primary battery for carbon dioxide conversion.

Separation of the metal oxide may precipitate the metal oxide by reducing a pH of the metal hydroxide contained in the second electrolyte solution, and the aqueous primary battery for carbon dioxide conversion may be continuously operated by continuously or discontinuously replenishing metal lost from the anode to the anode.

In addition, in the method for carbon dioxide conversion method according to an embodiment of the present invention, carbonate ions generated from the first electrolyte solution may be converted into carbon dioxide, and the converted carbon dioxide may be recovered to the cathode.

DETAILED DESCRIPTION OF EMBODIMENTS

Figure 1:
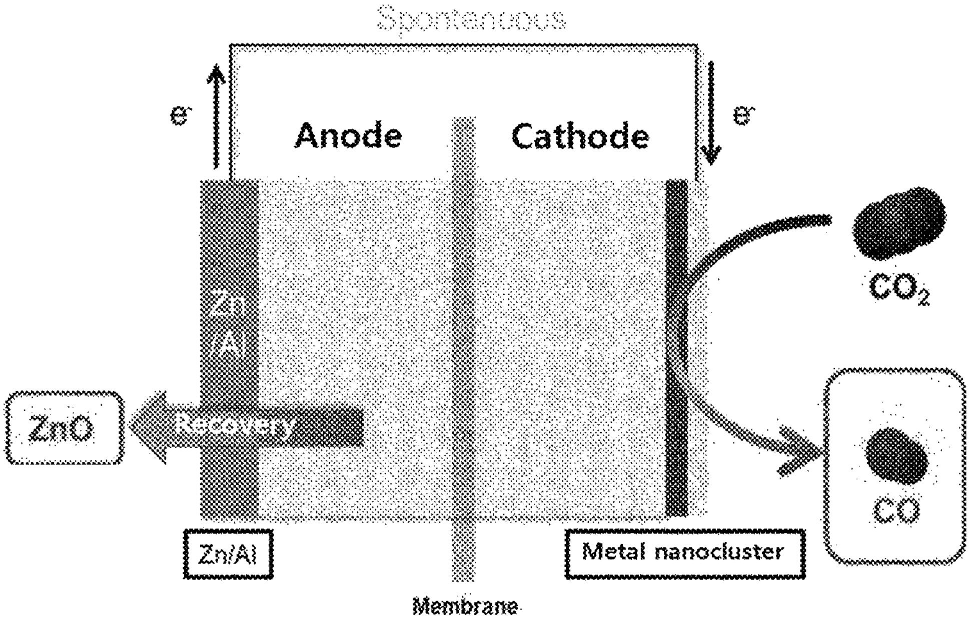
FIG. 1 is a schematic diagram illustrating an aqueous primary battery for carbon dioxide conversion according to an aspect of the present invention.
Figure 2:
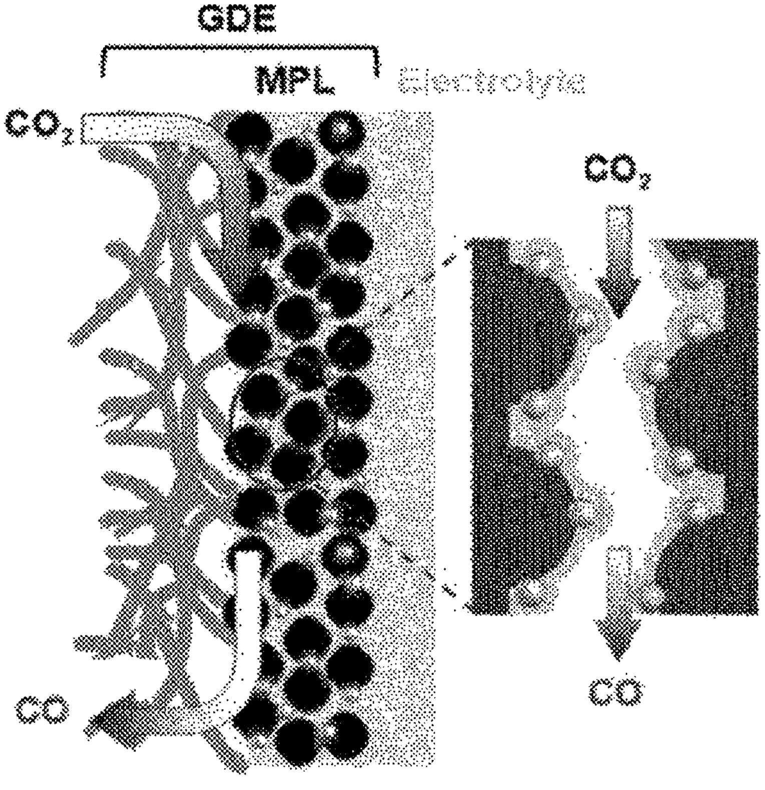
FIG. 2 is a schematic diagram of a gas diffusion electrode that is a cathode of the aqueous primary battery for carbon dioxide conversion according to the present invention.

Hereinafter, an aqueous primary battery for carbon dioxide conversion containing a metal nanocluster catalyst according to the present invention and a carbon dioxide conversion method using the same will be described in detail.

Singular forms used herein are intended to include the plural forms as well unless otherwise indicated in context.

In addition, numerical ranges used herein include a lower limit, an upper limit, and all values within that range, increments that are logically derived from the type and width of the defined range, all double-defined values, and all possible combinations of upper and lower limits of numerical ranges defined in different forms. Unless otherwise defined herein, values outside the numerical range that may arise due to experimental errors or rounded values are also included in the defined numerical range.

As used herein, the term "comprise" is an "open" description having the meaning equivalent to expressions such as "include," "contain," "have," or "feature", and does not exclude elements, materials, or process that are not further listed.

It will be understood that when an element such as a layer, a film, a region, a plate or the like as used herein, is referred to as being "on (or beneath)", "above (or below)" or "over (or under)" another element, it may be "directly on" another element or may have an intervening element present therebetween.

Hereinafter, the present invention will be described in detail. Technical terms and scientific terms used herein have the general meaning understood by those skilled in the art to which the present invention pertains, unless otherwise defined, and a description for the known function and configuration unnecessarily obscuring the gist of the present invention will be omitted in the following description.

The present invention provides an aqueous primary battery for carbon dioxide conversion containing a metal nanocluster catalyst.

The aqueous primary battery for carbon dioxide conversion includes: a first electrolyte solution that is an aqueous electrolyte accommodated in a first reaction space; a cathode in contact with the first electrolyte solution; a second electrolyte solution that is an aqueous electrolyte accommodated in the second reaction space; and an anode made of a metal material in contact with the second electrolyte solution, wherein the cathode includes a metal nanocluster catalyst.

The aqueous primary battery for carbon dioxide conversion may reduce carbon dioxide, which is a greenhouse gas, and convert the carbon dioxide into high value-added carbon monoxide through metal nanoclusters included in a cathode.

Nanoclusters follow a superatom orbital theory in which valence electrons of particles composed of a specific number of metal atoms and ligands are newly defined, which is a theory that considers the nanocluster as one superatom. Nanoclusters are stable more than single atoms or nanoparticles, and have stronger molecular properties than metallic properties, and thus have completely different optical and electrochemical properties from the nanoparticles. In particular, optical, electrical, and catalytic properties of nanoclusters may be sensitively changed depending on the number of metal atoms, types of metal atoms, and ligands.

In an embodiment, the metal nanocluster catalyst may have an average particle diameter of 10 nm or less or 5 nm or less, advantageously 2 nm or less, and without limitation, 0.2 nm or more. A significant reduction in the average particle diameter of the metal nanocluster catalyst included in the cathode is advantageous in that the specific surface area of the catalyst relative to the nanoparticles having an average particle diameter of tens to hundreds of nanometers is maximized, and catalytic properties are significantly improved to increase the selectivity for carbon monoxide during carbon dioxide conversion.

In a specific aspect, a metal nanocluster may be represented by the following Formula 1:

$$M_xN_y(SR)_z \quad \text{[Formula 1]}$$

wherein M is Au;

N is Ag, Cu, Ni, Pd or Pt;

SR is $C_1$-$C_{20}$ alkylthiol, $C_6$-$C_{20}$ allylthiol, $C_3$-$C_{20}$ cycloalkanethiol, $C_5$-$C_{20}$ heteroallylthiol, $C_3$-$C_{20}$ heterocycloalkanethiol, or $C_6$-$C_{20}$ arylalkanethiol;

x is 2, 4 12 or 25;

y is 0, 1, 2, 3, 4 or 32; and z is 8, 10, 18 or 30.

The metal nanocluster may contain a metals that have weak bonding with carbon monoxide to significantly increase the selectivity for carbon monoxide, and the ligand (SR) may contain organic thiol-based compounds to serve as a protective agent for stabilizing the metal nanoclusters.

Preferably, SR, which is an organothiol-based ligand, according to an embodiment of the present invention, may be any one or two or more selected from the group consisting of an alkanethiol having 1 to 20 carbon atoms, an arylthiol having 6 to 20 carbon atoms, a cycloalkanethiol having 3 to 20 carbon atoms, a heteroarylthiol having 5 to 20 carbon atoms, a heterocycloalkanethiol having 3 to 20 carbon atoms, or a arylalkanethiol having 6 to 20 carbon atoms, and in the organic thiol-based ligand, one or more hydrogens in a functional group may be further substituted with a substituent or may not be substituted, wherein the substituent is an alkyl group having 1 to 10 carbon atoms, a halogen group (—F, —Br, —Cl, —I), a nitro group, a cyano group, a hydroxyl group, an amino group, an aryl group having 6 to 20 carbon atoms, an alkenyl group having 2 to 7 carbon atoms, a cycloalkyl group having 3 to 20 carbon atoms, a heterocycloalkyl group having 3 to 20 carbon atoms, or a heteroaryl group having 4 to 20 carbon atoms, provided that the number of carbon atoms of the organic thiol-based ligand described above does not include the number of carbon atoms of the substituent. In addition, in all functional groups including the alkyl group, the alkyl group may be linear or branched.

Specifically, the organothiol-based ligand may be any one or two or more selected from the group consisting of an alkanethiol having 1 to 10 carbon atoms, an arylthiol having 6 to 10 carbon atoms, a cycloalkanethiol having 3 to 10 carbon atoms, a heteroarylthiol having 5 to 10 carbon atoms, a heterocycloalkanethiol having 3 to 10 carbon atoms, or an arylalkanethiol having 6 to 10 carbon atoms.

More specifically, the organic thiol-based ligand may be, but is not limited to, any one or two or more selected from the group consisting of pentanethiol, hexanethiol, heptanethiol, 2,4-dimethylbenzenethiol, 2-phenylethanethiol, glutathione, tiopronin, p-mercaptophenol, and (r-mercaptopropyl)-trimethoxysilane.

More specifically, the organothiol-based ligand may be $SC_6H_{13}$ or $SPh(CH_3)_2$, but the present invention is not limited thereto.

In another aspect, a metal nanocluster may be represented by the following Formula 2:

$$M_x(SR)_y \quad \text{[Formula 2]}$$

wherein M is gold or silver, Sr is $C_1$-$C_{20}$ alkylthiol, $C_3$-$C_{20}$ alkenylthiol, $C_3$-$C_{20}$ alkynylthiol, $C_6$-$C_{20}$ allylthiol, $C_3$-$C_{20}$ cycloalkylthiol, $C_5$-$C_{20}$ heteroallylthiol, $C_3$-$C_{20}$ heterocycloalkylthiol, or $C_6$-$C_{20}$ aryl$C_1$-$C_{20}$ alkylthiol, x is 25, 38 or 144, and y is 18, 24, 25 or 60.

More specifically, SR may be $C_1$-$C_{10}$ alkylthiol, $C_3$-$C_{10}$ alkenylthiol, $C_3$-$C_{10}$ alkynylthiol, $C_6$-$C_{12}$ allylthiol, $C_3$-$C_{10}$ cycloalkylthiol, $C_5$-$C_{12}$ heteroallylthiol, $C_3$-$C_{10}$ heterocycloalkylthiol, or $C_6$-$C_{10}$ aryl$C_1$-$C_{10}$ alkylthiol. In addition, in the SR, one or more hydrogens in a functional group may be further substituted with a substituent, wherein the substituent may be C1-C10 alkyl, halogen (—F, —Br, —Cl, —I), nitro, cyano, hydroxy, amino, $C_6$-$C_{20}$ aryl, $C_2$-$C_7$ alkenyl, $C_3$-$C_{20}$ cycloalkyl, $C_3$-$C_{20}$ heterocycloalkyl, or $C_5$-$C_{20}$ heteroaryl, but the present invention is not limited thereto.

Preferably, the metal nanocluster represented by Formula 1 or Formula 2 may be one or two or more selected from the group consisting of $Au_{25}(SR)_{25}$, $Au_{12}Ag_{32}(SR)_{30}$, $Au_{12}Cu_{32}(SR)_{30}$, $PtAu_{24}(SR)_{18}$, $Au_4Ni_2(SR)_8$, $Au_2Ni_3(SR)_8$, and $Au_2Ni_4(SR)_{10}$, but the present invention is not limited thereto.

In an embodiment of the present invention, the cathode may include a porous support and a metal nanocluster fixed to pores of the porous support. Specifically, the metal nanocluster may be fixed by penetrating at least some of the pores present in and/or on a surface of the porous support, preferably, pores present in the inside. In this case, the metal nanocluster may be uniformly dispersed inside the porous support without being coated or laminated on the surface of the porous support, and a wide dispersion of the metal nanocluster may maximize a surface area of the catalyst to significantly improve its activity.

The porous support according to an embodiment may include a carbon-based support, and specifically, may be, but is not limited to, one or two or more selected from the group consisting of carbon black, carbon nanotubes, graphene, carbon nanofibers, and graphitized carbon black.

A method of supporting a metal nanocluster on a porous support according to an exemplary embodiment may include preparing a solution in which the metal nanocluster is dispersed and dropping it on the porous support, drying the solution, and then performing heat treatment. According to the above method, a metal nanocluster dispersion may be easily applied to the entire area of the support according to a capillary phenomenon just by dropping the metal nanocluster dispersion on the porous support, and may be uniformly coated and stably supported. In this case, the solvent used may be any organic solvent that may be recognized by those skilled in the art. Specific examples of the solvent may include, but are not limited to, one or two or more selected from the group consisting of ethanol, methanol, isopropanol, butanol, pentanol, hexanol, dichloromethane, hexane, acetone, ethylene glycol, diethylene glycol, glycerol, and propylene glycol.

As the metal nanocluster is included as a catalyst compound of the cathode, it may be dispersed and adsorbed at a molecular level in pores of the porous support compared to the conventional metal nanoparticle catalyst. Therefore, the cathode including the metal nanocluster may have significant electrochemical carbon dioxide conversion properties compared to the cathode including the metal nanoparticle catalyst.

The anode made of a metal may be aluminum (Al) or zinc (Zn). Zinc or aluminum has abundant reserves and is inexpensive, so the aqueous primary battery for carbon dioxide conversion according to the present invention using the same has high industrial usefulness and is economical.

The aqueous primary battery for carbon dioxide conversion according to an embodiment may further include a porous ion-permeable member partitioning the first reaction space and the second reaction space, and the member is composed of a porous structure and may only allow movement of ions.

In an embodiment, the material of the ion-permeable member may be glass, and porous glasses having a pore size of 40 to 90 microns corresponding to G2 grade, a pore size of 15 to 40 microns corresponding to G3 grade, a pore size of 5 to 15 microns corresponding to G4 grade, and a pore size of 1 to 2 microns corresponding to G5 grade, may be may be used, but the present invention is not limited thereto.

In another embodiment, the porous ion-permeable member may be an ion exchange membrane, and such an ion exchange membrane may be made of an ion exchange resin and ionomer known in the art, or may be purchased as a film and used.

For example, a Nafion™ series membrane, perfluorinated sulfonic acid group-containing polymer from DuPont, USA, may be used, and in a similar form, an Aquibion PFSA membrane from Solvey, which is a commercial membrane, a FumaSep ion exchange membrane, including cation and anion exchange membranes from Fumatek, an Aciplex-S membrane from Asahi Chemicals, a Dow membrane from Dow Chemicals, a Flemion membrane from Asahi Glass, a GoreSelect membrane from Gore & Associates, etc. may be used, but the present invention is not limited thereto.

In an aspect of the present invention, the cathode may be at least partially submerged in the first electrolyte solution, and the anode may be at least partially submerged in the second electrolyte solution. As illustrated in the schematic diagram of the primary battery of FIG. 1, the primary battery may be operated in a spontaneous reaction without external power, in which as the metal of the anode is oxidized to metal oxide, electrons move to the cathode, and carbon dioxide is reduced to carbon monoxide due to the moved electrons.

Figure 8:
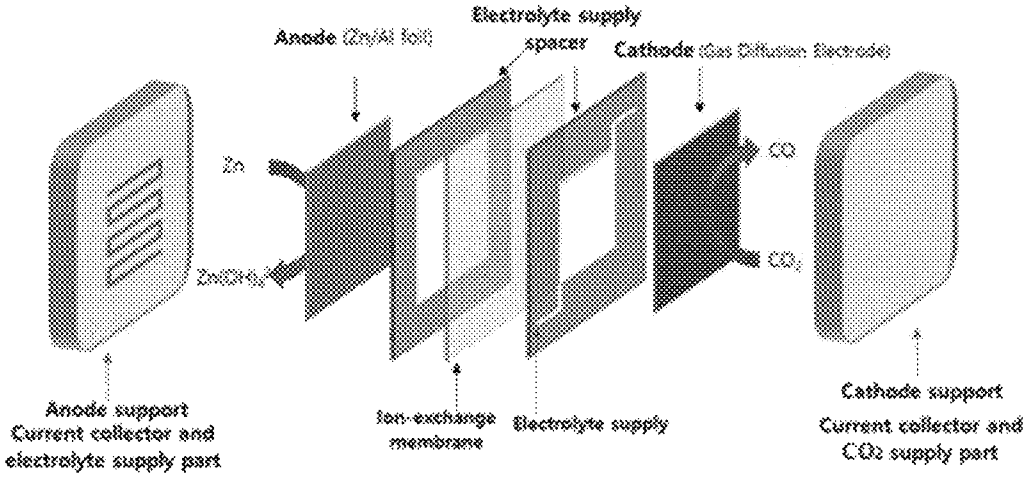
FIG. 8 is a schematic diagram illustrating an aqueous primary battery for carbon dioxide conversion according to another aspect of the present invention.

In another aspect of the present invention, as illustrated in FIG. 8, the first reaction space and the second reaction space may each independently include an electrolyte supply spacer.

Specifically, the anode and cathode of the aqueous primary battery is in contact with one surface of each electrolyte supply spacer, and the other surface of the electrolyte supply spacer is in contact with the porous ion permeable member. Thus, the aqueous primary battery may have a zero-gap structure in which a gap between the electrode, the electrolyte supply spacer, and the porous ion-permeable member is eliminated.

The aqueous primary battery having a zero-gap structure may reduce solution ion resistance due to an electrolyte located in a gap between an electrode and a porous ion-permeable member, and mass transfer resistance due to a product gas.

Figure 9:
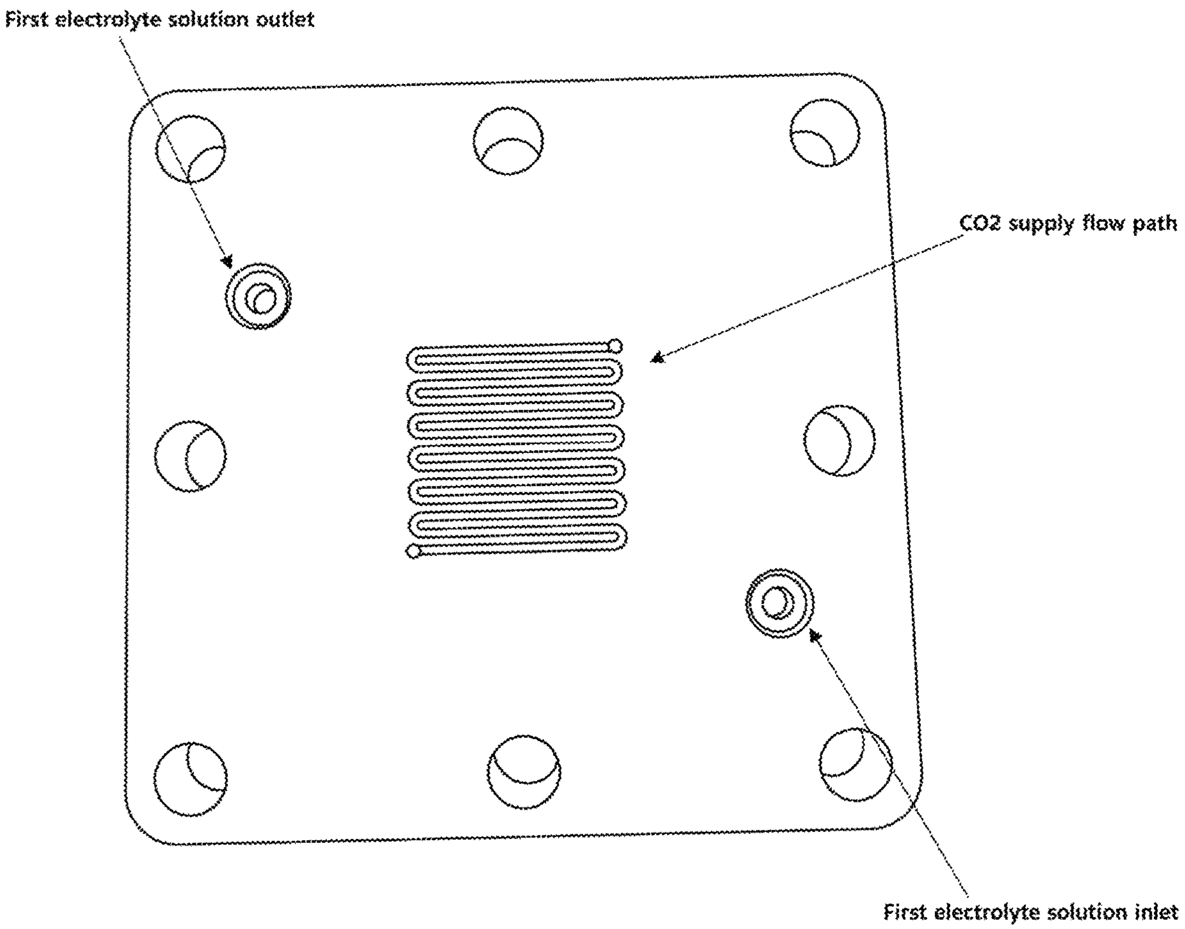
FIG. 9 is a diagram illustrating a cathode support according to the present invention.

The first electrolyte solution and the second electrolyte solution may be continuously supplied to the anode and the cathode through each electrolyte supply spacer. More specifically, referring to FIG. 9, the first electrolyte solution may be introduced and discharged through the first electrolyte inlet and the first electrolyte outlet of the cathode support positioned on one surface of the cathode.

Figure 10:
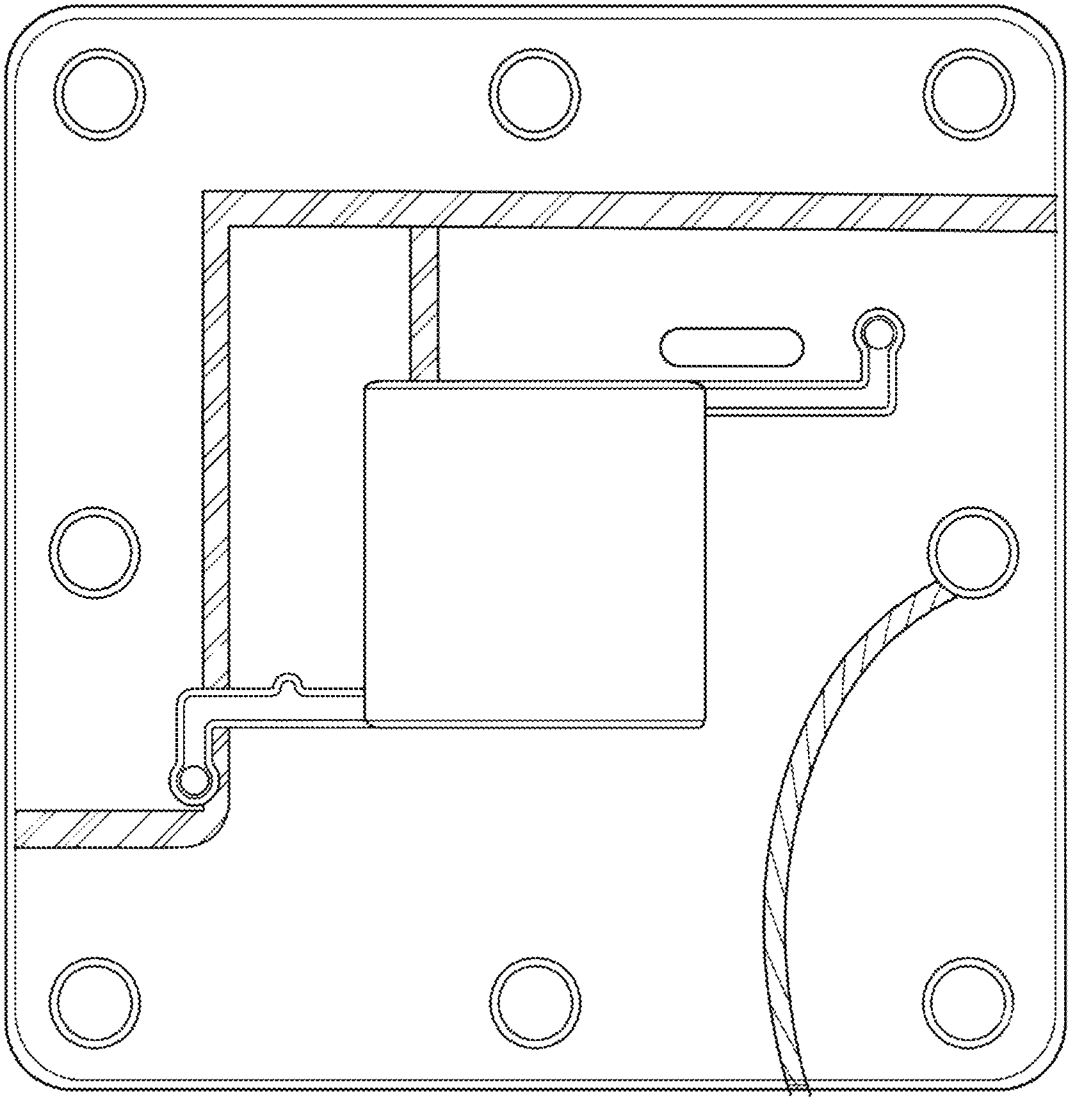
FIG. 10 is a diagram illustrating an electrolyte supply spacer according to the present invention.

As illustrated in FIG. 10, the first electrolyte solution inlet and the first electrolyte solution outlet may be connected to a first electrolyte supply spacer. The first electrolyte solution introduced into the first electrolyte inlet may move to the electrolyte supply spacer connected thereto, so that the cathode and the electrolyte solution may contact each other. Here, carbon dioxide may be introduced into the cathode through the carbon dioxide inlet included in the cathode support, converted into carbon monoxide, and discharged through the carbon monoxide outlet.

In addition, in the anode, like the cathode, the electrolytes solution may be introduced and discharged through an anode support including a second electrolyte solution inlet and a second electrolyte solution outlet, and the introduced second electrolyte solution may oxidize the anode by contacting the anode made of metal through a second electrolyte solution supply spacer connected to the second electrolyte solution inlet and the second electrolyte solution outlet.

A crossover phenomenon of ions may be prevented through the electrolyte supply spacer. Crossover refers to a phenomenon in which ions generated by oxidation of the metal at the anode pass through the porous ion-permeable member and move to the cathode, and carbonate ions produced by reduction of carbon dioxide at the cathode also pass through the porous ion-permeable member and move to the anode.

Contamination of the anode and the cathode due to crossover may cause a problem in that a resistance of the battery increases and a carbon dioxide conversion efficiency decreases. Therefore, it is advantageous in that contamination of the anode and cathode may be prevented by introducing an electrolyte supply spacer in contact with one surface of the anode and cathode to prevent crossover of ions, and a battery driving efficiency may be improved by supplying a sufficient amount of electrolyte to the anode and cathode.

In an embodiment, the electrolyte supply spacer may have a thickness of 0.5 to 3 mm, preferably 0.8 to 2.3 mm, and more preferably 1.2 to 1.8 mm. The use of a thin electrolyte supplying spacer may minimize the resistance of a battery and at the same time prevent crossover of ions.

The electrolyte supply spacer may include silicone-based resin, acrylic-based resin, epoxy-based resin, fluorine-based resin, urethane-based resin, and the like, and may preferably include poly(methyl methacrylate) (PMMA), but the present invention is not limited thereto.

In an embodiment, the first electrolyte solution may be an acidic, neutral or basic electrolyte, and specifically may be an aqueous solution of sodium hydroxide, potassium hydroxide, potassium chloride, or potassium hydrogen carbonate aqueous solution, but the present invention is not limited thereto.

Figure 11:
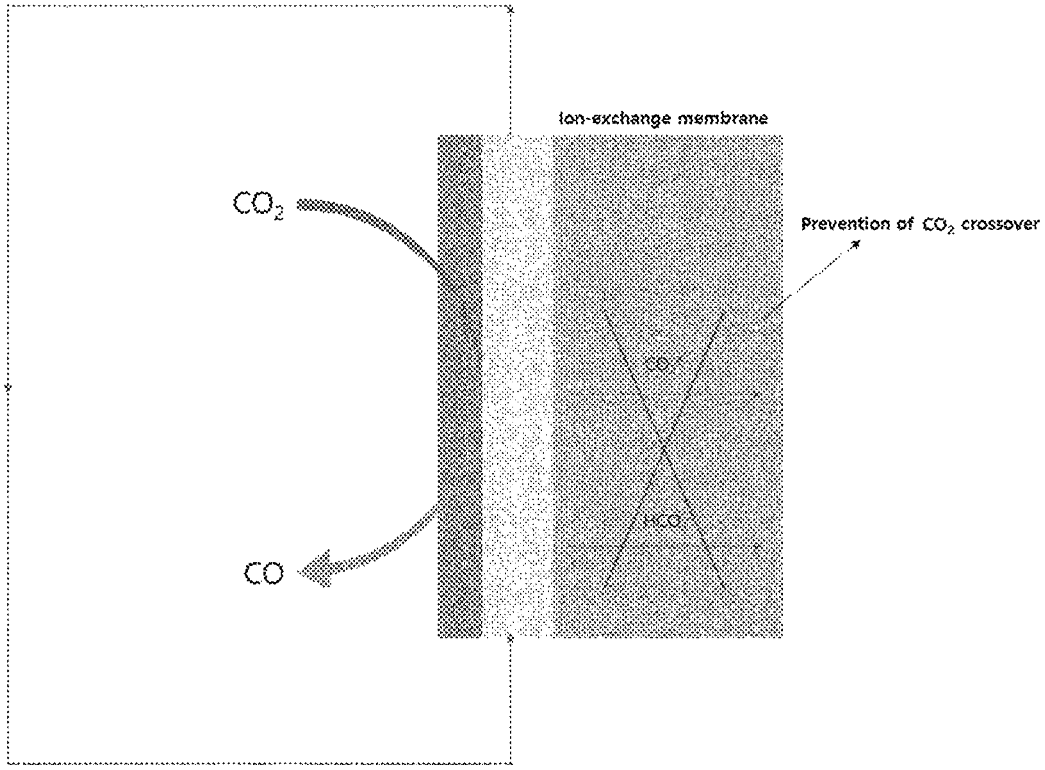
FIG. 11 is a schematic view illustrating a cathode, a first electrolyte solution supply spacer, and an ion exchange membrane according to the present invention.

In an advantageous example, when the aqueous primary battery for carbon dioxide conversion has a zero-gap structure, the first electrolyte solution is preferably acidic or neutral. More specifically, the first electrolyte solution may have a pH of 9 or less, preferably 8 or less, advantageously 7 or less, and without limitation, the first electrolyte may have a pH of 5 or more. The electrolyte supply spacer including the acidic or neutral first electrolyte solution may prevent carbonic acid ions such as $CO_3^{2-}$ and $HCO_3^-$ generated from the cathode from passing over to the anode, as illustrated in FIG. 11 during carbon dioxide conversion, and may improve carbon dioxide conversion efficiency by easily recovering gaseous carbon dioxide due to its low solubility in carbon dioxide.

The second electrolyte solution may be a neutral or basic electrolyte, and may specifically be an aqueous solution of potassium chloride, sodium hydroxide, or potassium hydroxide, preferably a strongly basic aqueous solution of sodium hydroxide or potassium hydroxide, but the present invention is not limited thereto.

In an embodiment, when the second electrolyte solution is a basic electrolyte solution, a reaction shown in Scheme 1 below may occur:

$$Zn+4OH^- \text{->} Zn(OH)_4^{2-}+2e^- \quad \text{[Scheme 1]}$$

In an embodiment, when the second electrolyte solution is a neutral electrolyte, a reaction shown in Scheme 2 below may occur:

$$Zn \rightarrow Zn^{2+}+2e^- \quad \text{[Scheme 2]}$$

Since Zn decreases as the reaction proceeds, a mechanical recharge method for supplying new Zn may be performed, and a method for supplying Zn in a form of foil or pellets may be used, but the present invention is not limited thereto.

In an embodiment, zinc or aluminum metal of the anode may be oxidized to a metal oxide, and the cathode may reduce carbon dioxide to carbon monoxide.

Electrons generated as the metal of the anode is oxidized to metal oxide move to the cathode, and carbon dioxide may be reduced to carbon monoxide through the electrons moved to the cathode. Accordingly, the aqueous primary battery for carbon dioxide conversion according to the present invention may operate without external power, and may operate semi-permanently as long as the metal of the anode is not consumed. An aqueous primary battery for carbon dioxide conversion according to an embodiment may spontaneously convert carbon dioxide into carbon monoxide at a very high current density, and may exhibit improved selectivity in which the conversion reaction into carbon monoxide is superior to hydrogen generation.

The present invention provides a conversion method for reducing carbon dioxide to carbon monoxide using an aqueous primary battery for carbon dioxide conversion.

The conversion method may include: supplying carbon dioxide to a cathode of an aqueous primary battery for carbon dioxide conversion according to an embodiment of the present invention; and obtaining carbon monoxide converted from carbon dioxide at the cathode.

In addition, in the carbon dioxide conversion method according to an embodiment of the present invention, metal oxide generated from the second electrolyte solution may be separated, and the separated second electrolyte solution may be recycled to the aqueous primary battery for carbon dioxide conversion.

Separation of the metal oxide may precipitate the metal oxide by reducing a pH of the metal hydroxide contained in the second electrolyte solution, and the aqueous primary battery for carbon dioxide conversion may be continuously operated by continuously or discontinuously replenishing metal lost from the anode to the anode. The replenishment method of the metal may be a mechanical recharge method, and may be a method of supplying metal in a form of foil or pellets, but the present invention is not limited thereto.

In the conversion method according to an embodiment of the present invention, a reaction shown in Scheme 1 below may occur in the second electrolyte solution of the anode, and when the pH of the second electrolyte solution is lowered, a reaction shown in Scheme 3 below may occur to obtain ZnO. As a method of lowering the pH, a method of directly adding an acidic solution or a method of bubbling carbon dioxide may be used. The obtained ZnO may be reused as a raw material for other chemical processes, so the conversion method of the present invention may be very economical and environmentally friendly.

$$Zn+4OH^- \rightarrow Zn(OH)_4^{2-}+2e^- \quad \text{[Scheme 1]}$$

$$Zn(OH)_4^{2-} \rightarrow ZnO+H_2O+2O^- \quad \text{[Scheme 3]}$$

In an embodiment, carbonate ions generated from the first electrolyte solution may be converted into carbon dioxide by a reaction shown in Scheme 4 below.

$$HCO_3^-+H^+ \rightarrow CO_2+H_2O \quad \text{[Scheme 4]}$$

Carbon dioxide may be obtained by reacting hydrogen ions ($H^+$) contained in the first electrolyte solution with carbonate ions generated by a carbon dioxide conversion reaction. The obtained carbon dioxide may be recovered to the cathode and used again for the carbon dioxide conversion reaction. By easily recovering carbon dioxide to the cathode using the first electrolyte solution having low carbon dioxide solubility, the carbon dioxide conversion efficiency may be remarkably improved by preventing ion crossover.

Hereinafter, an aqueous primary battery for carbon dioxide conversion containing a metal nanocluster catalyst according to the present invention and a carbon dioxide conversion method using the same will be described in more detail through specific Examples.

The following Examples are only a reference for describing the present invention in detail, and the present invention is not limited thereto and may be implemented in various forms. In addition, the terms used in the description of the present invention are only for effectively describing specific embodiments, and are not intended to limit the present invention.

Example 1

After dissolving 80 μg of $Au_{25}(SC_6H_{13})_{18}$ as a metal nanocluster in 50 μL of a solution of 1:1 volume ratio of dichloromethane and acetone, the dissolved solution was dropped onto a gas diffusion electrode to manufacture an electrode as illustrated in the schematic diagram of FIG. 1 and used as a cathode, zinc was used as an anode, and the anode and cathode were separated using an ion exchange membrane, Nafion (Dupant). An aqueous primary battery having the form as illustrated in FIG. 1 was prepared by using the cathode-supported first electrolyte solution as an aqueous potassium hydrogen carbonate solution (0.1M) and the anode-supported second electrolyte solution as an aqueous sodium hydroxide solution (6M).

Example 2

An aqueous primary battery was manufactured in the same manner as in Example 1, except that $Au_{12}Ag_{32}(SC_6H_{13})_{30}$ was used instead of $Au_{25}(SC_6H_{13})_{18}$ as the metal nanocluster.

Example 3

An aqueous primary battery was manufactured in the same manner as in Example 1, except that $Au_{12}Cu_{32}(SC_6H_{13})_{30}$ was used instead of $Au_{25}(SC_6H_{13})_{18}$ as the metal nanocluster.

Example 4

An aqueous primary battery was manufactured in the same manner as in Example 1, except that $PtAu_{24}(SC_6H_{13})_{18}$ was used instead of $Au_{25}(SC_6H_{13})_{18}$ as the metal nanocluster.

Example 5

An aqueous primary battery was manufactured in the same manner as in Example 1, except that $Au_4Ni_2(SC_6H_{13})_8$ was used instead of $Au_{25}(SC_6H_{13})_{18}$ as the metal nanocluster.

Example 6

An aqueous primary battery was manufactured in the same manner as in Example 1, except that $Au_2Ni_3(SC_6H_{13})_8$ was used instead of $Au_{25}(SC_6H_{13})_{18}$ as the metal nanocluster.

Example 7

An aqueous primary battery was manufactured in the same manner as in Example 1, except that $Au_2Ni_4(SR)_{10}$ was used instead of $Au_{25}(SC_6H_{13})_{18}$ as the metal nanocluster.

Example 8

The same metal nanocluster, anode, cathode, first electrolyte solution, second electrolyte solution, and ion exchange membrane as in Example 1 were used, but an ion exchange membrane was placed between the anode and the cathode, a second electrolyte supply spacer was introduced between the anode and the ion exchange membrane, a first electrolyte supply spacer was introduced between the cathode and the ion exchange membrane, and then compressed using stainless steel to manufacture an aqueous primary battery.

Example 9

An aqueous primary battery was manufactured in the same manner as in Example 8, except that the aqueous primary battery did not include a first electrolyte supply spacer and a second electrolyte supply spacer.

Comparative Example 1

An aqueous primary battery was manufactured in the same manner as in Example 1, except that a gas diffusion electrode containing Au/C was used as a cathode instead of the metal nanocluster.

The gas diffusion electrode containing Au/C was manufactured by dispersing 80 μg of Au/C (Premetek) in 50 μL of THF using a sonicator, adding 3.5 μL of Nafion binder (Sigma-aldrich), stirring and then dropping the resulting mixture, and then dropping it on the gas diffusion electrode.

Experimental Example 1

Carbon dioxide conversion efficiency and selectivity were measured while directly supplying carbon dioxide to the aqueous primary battery of Example 1.

Carbon dioxide was supplied at a flow rate of 30 sccm using a mass flow controller (MFC) device. Carbon dioxide was supplied to the inlet, and converted carbon monoxide and unconverted carbon dioxide were released to the outlet.

Figure 3:
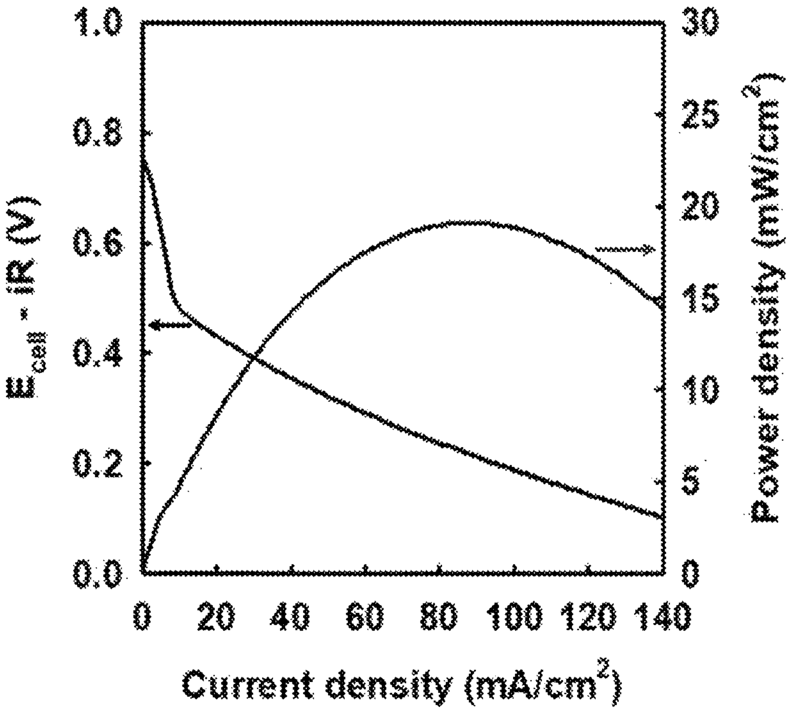
FIG. 3 is a diagram illustrating a result of measuring a potential while changing a current by a current sweep method of Example 1.

FIG. 3 illustrates the result of measuring the potential while changing the current with a potentiostat in a current sweep method, from which it can be seen that in a black graph, a positive value of $E_{cell}$ means that the reaction may occur spontaneously, and thus carbon dioxide may be spontaneously converted to carbon monoxide up to a current density of about 100 mA/$cm^2$.

In addition, a power density of a right y-axis, which is a red graph in FIG. 3, represents the power density, which means the amount of power that may be generated per unit volume, and may be represented by multiplying an x-axis and a y-axis of the graph obtained from the current sweep. It can be seen that a power density of about 19.1 mA/cm$^2$ is exhibited.

Figure 4:
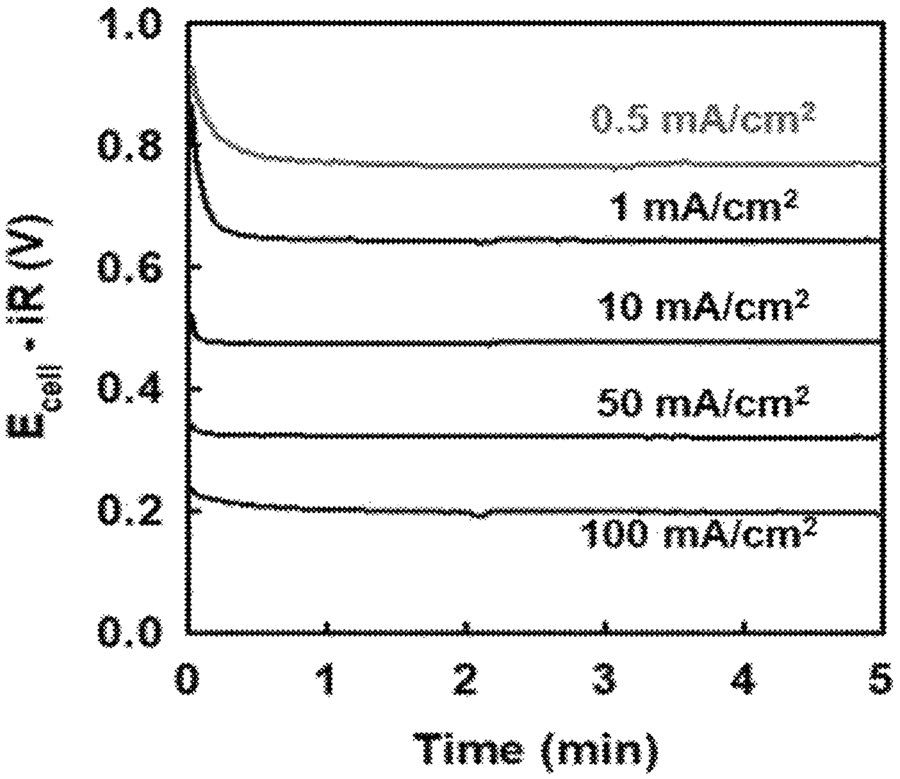
FIG. 4 is a constant current discharge graph of Example 1.

FIG. 4 illustrates a constant current discharge graph, from which it can be seen that carbon dioxide may be converted spontaneously ($E_{cell}$>0) up to a current density of about 100 mA/cm$^2$. Thus, it can be seen that the aqueous primary battery of Example 1 of the present invention exhibits excellent carbon dioxide conversion performance with significantly improved current density results.

Figure 5:
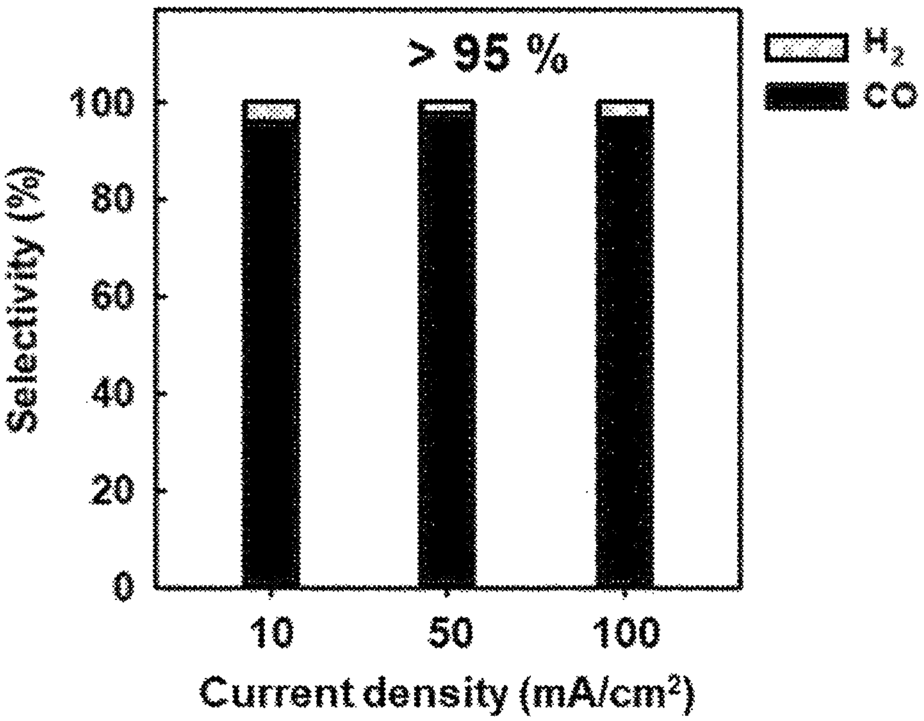
FIG. 5 is a graph illustrating selectivity to carbon monoxide of Example 1.

In addition, FIG. 5 is a graph illustrating the selectivity for the conversion reaction to carbon monoxide rather than hydrogen generation at a current density of 10 to 100 mA/cm$^2$ where a spontaneous reaction occurs, from which it can be seen that the selectivity is very high of 95% or more.

Experimental Example 2

After operating the aqueous primary battery of Example 1, a second electrolyte, in which $Zn(OH)_4^{2-}$ was dissolved, was separated and lowered to pH 10, and a white solid selected was filtered. The white solid was washed with water and then dried in an oven at 80° C. to obtain ZnO.

Figure 6:
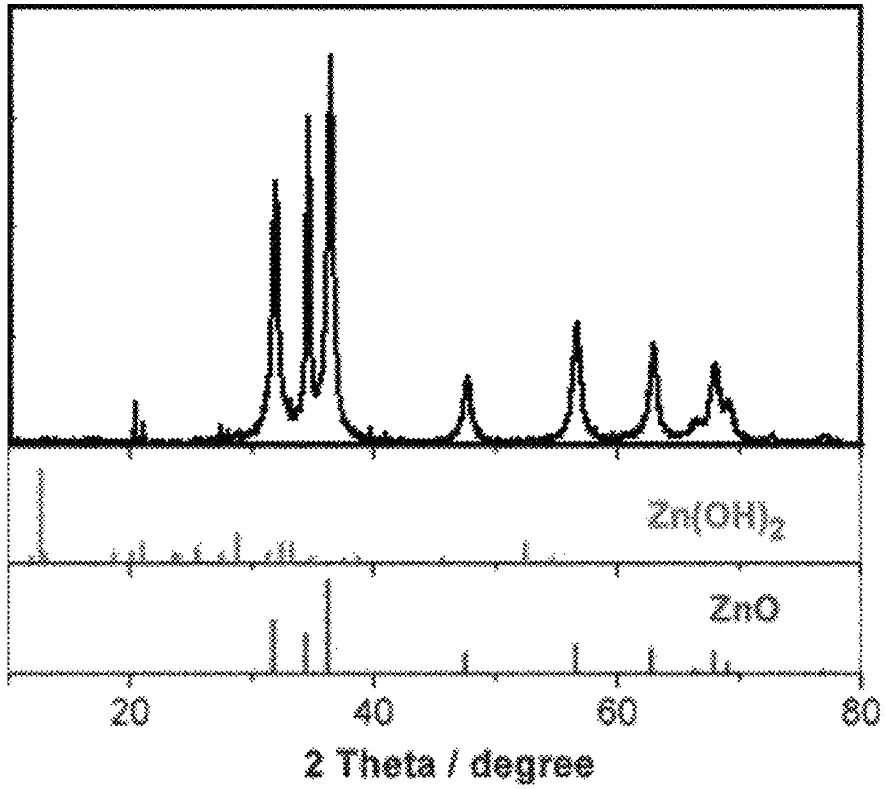
FIG. 6 is a graph illustrating an XRD measurement result of recovered ZnO in Example 1.

The XRD measurement result of the obtained ZnO is illustrated in FIG. 6. As illustrated, it can be seen that the powder obtained from the anode appeared as ZnO crystals, and through this, the aqueous primary battery may also recover ZnO while converting carbon dioxide into carbon monoxide without external power supply.

Experimental Example 3

Experimental Example 3 was carried out in the same manner as in Experimental Example 1, except that Example 1 and Comparative Example 1 were used instead of Example 1.

Figure 7:
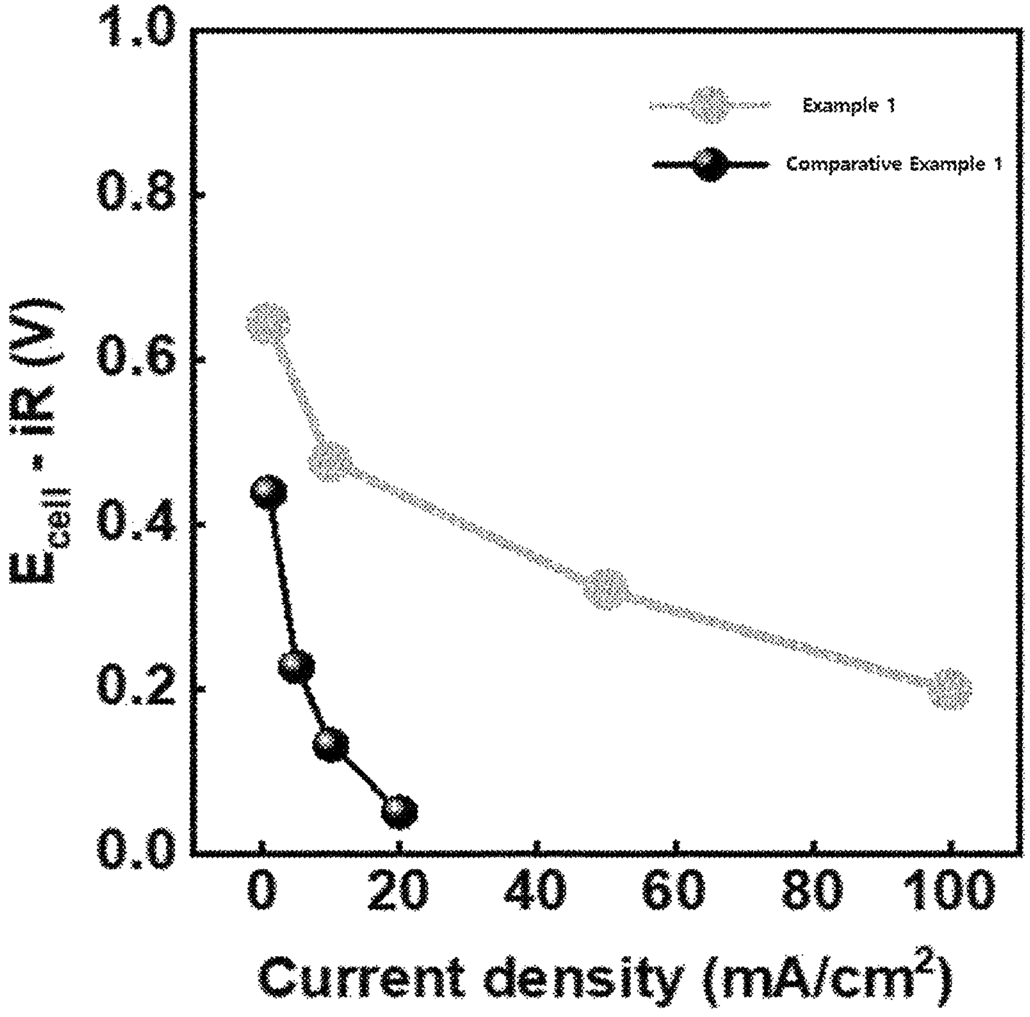
FIG. 7 is a diagram illustrating a result of measuring a potential while changing a current by the constant current discharge method of Example 1 and Comparative Example 1.

FIG. 7 illustrates the result of measuring the potential while changing the current with a potentiostat in a constant voltage discharge method, from which it can be seen that Example 1 shows that the $E_{cell}$ may spontaneously convert carbon dioxide to carbon monoxide up to a positive current density of about 100 mA/cm$^2$, whereas Comparative Example 1 may spontaneously convert only up to a current density of 20 mA/cm$^2$. Thus, it can be seen that the aqueous primary battery of Example 1 containing the metal nanocluster according to the present invention exhibits excellent performance because it is possible to spontaneously convert carbon dioxide up to a remarkably high current density.

From these results, it can be seen that the aqueous primary battery of Example 1 according to the present invention may perform the conversion reaction of carbon dioxide to carbon monoxide with excellent selectivity and efficiency without external power, and is economical and eco-friendly for industrial use in a very cost-effective way because it may recover metals eluted into the electrolyte solution.

Experimental Example 4

Carbon dioxide was converted by circulating the first electrolyte solution and the second electrolyte solution at a flow rate of 3 mL/min while supplying carbon dioxide gas at 30 sccm to the cathode of the aqueous primary battery of Examples 8 and 9.

Figure 12:
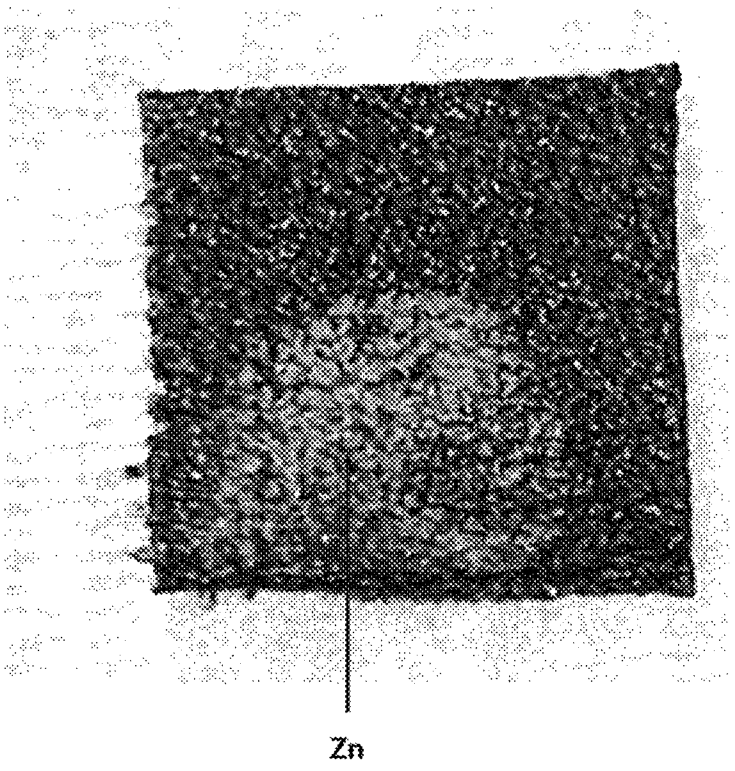
FIG. 12 is a diagram illustrating a cathode of Comparative Example 3.

FIG. 12 is a photograph of a surface of the cathode observed after carbon dioxide conversion reaction was performed using the aqueous primary battery of Example 9, wherein the cathode was contaminated by $Zn(OH)_4^{2-}$ dissolved in the anode passing through an ion-exchange membrane. Through this, in an aqueous primary battery that does not include an electrolyte supply spacer, ions such as $Zn(OH)_4^{2-}$ generated by an oxidation reaction at the anode, and $CO_3^{2-}$ and $HCO_3^-$ generated by a carbon dioxide reduction reaction at the cathode may pass through the ion-exchange membrane and contaminate the anode and cathode. As carbon dioxide conversion efficiency decreases due to contamination of the electrode due to an ion crossover phenomenon, the lifespan and carbon dioxide conversion efficiency of the battery may be improved by preventing the ion crossover phenomenon by introducing an electrolyte supply spacer.

Figure 13:
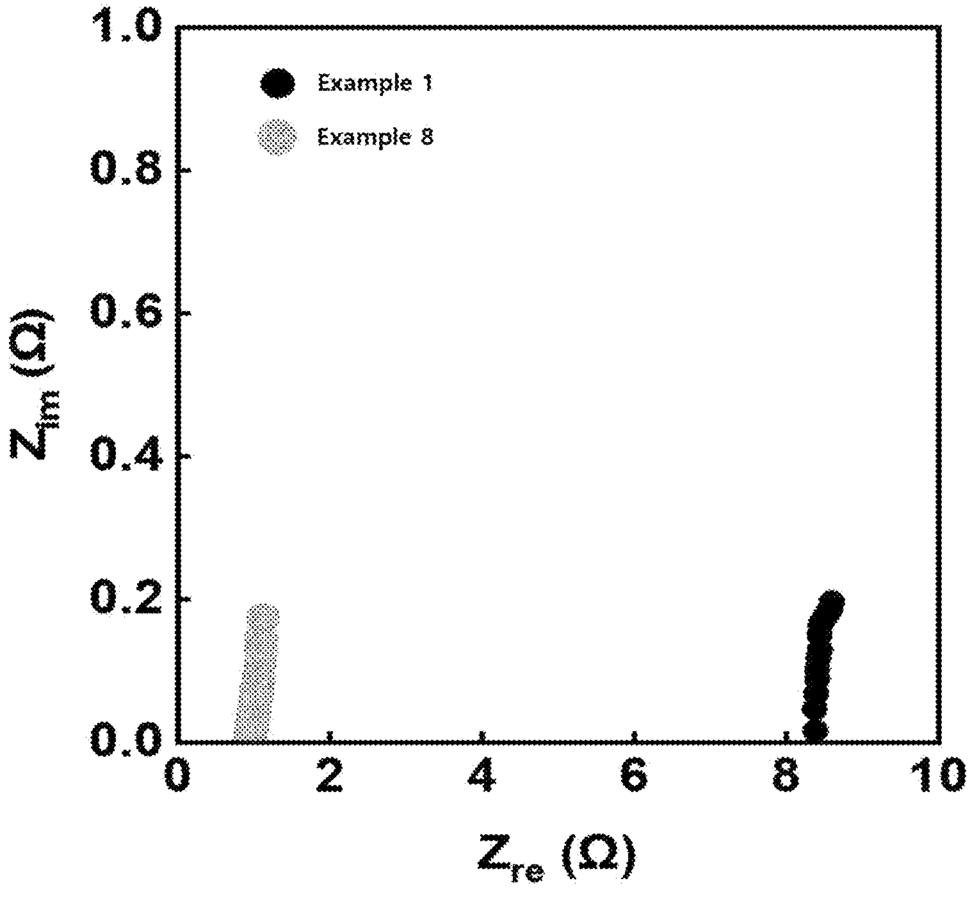
FIG. 13 is a graph obtained by measuring the resistance of aqueous primary batteries for carbon dioxide conversion manufactured by the methods of Example 8 and Comparative Example 2.

FIG. 13 is a graph obtained by measuring resistance of an aqueous primary battery of Example 1 in which carbon dioxide was converted by a method of Experimental Example 1, and an aqueous primary battery of Example 8 in which carbon dioxide was converted by a method of Experimental Example 4. The aqueous primary battery of Example 1 had a large resistance of 8.3 Ω because the electrolyte is located between the anode and the cathode and the distance between the electrodes is wide. The aqueous primary battery of Example 8 adopted a zero-gap structure that eliminates the gap between the anode and cathode to minimize battery resistance, and had a significantly reduced resistance to 0.7 as the anode and the cathode contact each electrolyte through the thin electrolyte supply spacer.

It can be seen that the aqueous primary battery having zero-gap structure and containing the electrolyte supply spacer significantly increases the lifespan and carbon dioxide conversion efficiency of the battery by preventing ion crossover and minimizing resistance.

The aqueous primary battery for carbon dioxide conversion of the present invention may reduce carbon dioxide, which is a greenhouse gas, may produce carbon monoxide, which is a high value-added material, may spontaneously convert up to high current density, and may also exhibit excellent selectivity for carbon monoxide with excellent performance.

In addition, the aqueous primary battery for carbon dioxide conversion of the present invention may not require external power, may use zinc or aluminum as an anode, which is economical in terms of price and reserves, and may recover an oxide of zinc or aluminum generated from the anode and reuse the oxide as a raw material of other processes, and thus may be used very economically.

Furthermore, it is possible to provide an aqueous primary battery for carbon dioxide conversion capable of preventing ion crossover and minimizing resistance.

Hereinabove, although the present invention has been described by specific matters, the limited embodiments, and Comparative Examples, they have been provided only for assisting in a more general understanding of the present invention. Therefore, the present invention is not limited to the exemplary embodiments. Various modifications and changes may be made by those skilled in the art to which the present invention pertains from this description.

Therefore, the spirit of the present invention should not be limited to the above-mentioned embodiments, but the claims and all of the modifications equal or equivalent to the claims are intended to fall within the scope and spirit of the present invention.

What is claimed is:

1. An aqueous primary battery for carbon dioxide conversion, comprising:

a first electrolyte solution that is an aqueous electrolyte accommodated in a first reaction space;

a cathode in contact with the first electrolyte solution;

a second electrolyte solution that is an aqueous electrolyte accommodated in the second reaction space; and an anode made of a metal material in contact with the second electrolyte solution, wherein the cathode includes a metal nanocluster catalyst, wherein the aqueous primary battery for carbon dioxide conversion is operated without external power, and wherein the aqueous primary battery for carbon dioxide conversion is continuously operated by continuously or discontinuously replenishing metal lost from the anode to the anode.

2. The aqueous primary battery for carbon dioxide conversion of claim 1, wherein the cathode is at least partially submerged in the first electrolyte solution, and the anode is at least partially submerged in the second electrolyte solution.

3. The aqueous primary battery for carbon dioxide conversion of claim 1, wherein the first reaction space and the second reaction space each independently include an electrolyte supply spacer, the cathode contacts one surface of the electrolyte supply spacer in the first reaction space, the anode contacts one surface of the electrolyte supply spacer included in the second reaction space, and the electrolyte supply spacer continuously supplies each electrolyte to the anode or cathode.

4. The aqueous primary battery for carbon dioxide conversion of claim 1, wherein the anode made of a metal material is aluminum (Al) or zinc (Zn).

5. The aqueous primary battery for carbon dioxide conversion of claim 1, wherein the metal nanocluster is represented by the following Formula 1:

$$M_xN_y(SR)_z \quad \text{[Formula 1]}$$

wherein M is Au;

N is Ag, Cu, Ni, Pd or Pt;

SR is $C_1$-$C_{20}$ alkylthiol, $C_6$-$C_{20}$ allylthiol, $C_3$-$C_{20}$ cycloalkanethiol, $C_5$-$C_{20}$ heteroallylthiol, $C_3$-$C_{20}$ heterocycloalkanethiol, or $C_6$-$C_{20}$ arylalkanethiol;

x is 2, 4 12 or 25;

y is 0, 1, 2, 3, 4 or 32; and z is 8, 10, 18 or 30.

6. The aqueous primary battery for carbon dioxide conversion of claim 1, wherein the metal nanocluster is represented by the following Formula 2:

$$M_x(SR)_y \quad \text{[Formula 2]}$$

wherein M is Au or Ag;

SR is $C_1$-$C_{20}$ alkylthiol, $C_3$-$C_{20}$ alkenylthiol, $C_3$-$C_{20}$ alkynylthiol, $C_6$-$C_{20}$ allylthiol, $C_3$-$C_{20}$ cycloalkylthiol, $C_5$-$C_{20}$ heteroallylthiol, $C_3$-$C_{20}$ heterocycloalkylthiol, or $C_6$-$C_{20}$ aryl$C_1$-$C_{20}$ alkylthiol;

x is 25, 38 or 144; and y is 18, 24, 25 or 60.

7. The aqueous primary battery for carbon dioxide conversion of claim 1, wherein the first electrolyte solution is an acidic, neutral or basic electrolyte, and the second electrolyte solution is a strongly basic electrolyte.

8. The aqueous primary battery for carbon dioxide conversion of claim 1, wherein the cathode is a gas diffusion electrode including a porous support and a metal nanocluster fixed to the pores of the porous support.

9. The aqueous primary battery for carbon dioxide conversion of claim 1, wherein the metal material of the anode is oxidized to a metal oxide, and the cathode reduces carbon dioxide to carbon monoxide.

10. The aqueous primary battery for carbon dioxide conversion of claim 1, further comprising a porous ion-permeable member partitioning the first reaction space and the second reaction space.

11. The aqueous primary battery for carbon dioxide conversion of claim 10, wherein a material of the ion-permeable member is glass.

12. The aqueous primary battery for carbon dioxide conversion of claim 10, wherein the porous ion-permeable member is an ion exchange membrane.

13. The aqueous primary battery for carbon dioxide conversion of claim 3, further comprising: a cathode support positioned on one surface of the cathode, and an anode support positioned on one surface of the anode, wherein the cathode support includes a first electrolyte inlet and a first electrolyte outlet, the anode support includes a second electrolyte inlet and a second electrolyte outlet, the first electrolyte inlet and the first electrolyte outlet of the cathode support are connected to the electrolyte supply spacer included in the first reaction space, and the second electrolyte inlet and the second electrolyte outlet of the anode support are connected to the electrolyte supply spacer included in the second reaction space.

14. The aqueous primary battery for carbon dioxide conversion of claim 13, wherein the cathode support further includes: a carbon dioxide inlet, a carbon monoxide outlet, and a flow path connecting the carbon dioxide inlet and the carbon monoxide outlet on one surface.

15. A carbon dioxide conversion method comprising:

supplying carbon dioxide to a cathode of an aqueous primary battery for carbon dioxide conversion; and obtaining carbon monoxide converted from carbon dioxide at the cathode, wherein the aqueous primary battery for carbon dioxide conversion is the aqueous primary battery for carbon dioxide conversion of claim 1, wherein the aqueous primary battery for carbon dioxide conversion is continuously operated by continuously or discontinuously replenishing metal lost from the anode to the anode.

16. The carbon dioxide conversion method of claim 15, wherein a metal oxide generated from the second electrolyte solution is separated, and the second electrolyte solution from which the metal oxide has been separated is recycled to the aqueous primary battery for carbon dioxide conversion.

17. The carbon dioxide conversion method of claim 16, wherein separation of the metal oxide precipitates the metal oxide by reducing a pH of a metal hydroxide contained in the second electrolyte solution.

18. The carbon dioxide conversion method of claim 15, wherein carbonate ions generated from the first electrolyte solution are converted into carbon dioxide, and the converted carbon dioxide is recovered to the cathode.

* * * * *